United States Patent Office 2,824,841
Patented Feb. 25, 1958

2,824,841

SCINTILLATOR COMPOSITION FOR COUNTERS AND METHOD OF MAKING

Warren L. Buck, Park Forest, and Robert K. Swank, Downers Grove, Ill., assignors to the United States of America as represented by the United States Atomic Energy Commission No Drawing. Application October 20, 1953
Serial No. 387,337

8 Claims. (Cl. 252—301.2)

This invention deals with a new composition for scintillation counters, and in particular with new plastic scintillators and the method of making them. Scintillation counters are used for measuring charged particles, for instance for measuring beta radiation. They are measuring instruments well known in the art and the principle on which they are based is described in a great number of publications. For instance, the book "Source Book on Atomic Energy" by Samuel Glasstone contains a description of scintillation counters on pages 140–142, and another good description is contained in the article "Two Liquid Scintillation Neutron Detectors" by Muelhause and Thomas, published in Nucleonics 11, 44 (1953).

There are three types of scintillation counters, depending on the type of scintillator composition used, namely, those which use a crystal of a solid hydrocarbon as a scintillator, those which have a liquid solution, and those which employ a solid solution in a plastic polymer as the scintillator. This invention is concerned with plastic scintillator compositions. Details on plastic scintillators broadly are set forth in the copending application Serial No. 322,446, entitled "Neutron Scintillation Detector," now Patent No. 2,755,253, granted July 17, 1956.

It is an object of this invention to provide a plastic scintillator composition for counting charged particles which has a very high efficiency.

It is another object of this invention to provide a plastic scintillator composition for counting charged particles which is comparatively inexpensive.

It is another object of this invention to provide a plastic scintillator composition which can be prepared easily and in a great variety of shapes and in large sizes on a mass production basis.

It is another object of this invention to provide a plastic scintillator composition which is firm and sturdy.

It is a further object of this invention to provide a plastic scintillator composition which can be machined easily.

It is still another object of this invention to provide a plastic scintillator composition which has a low vapor pressure.

It is still another object of this invention to provide a plastic scintillator composition which has excellent electrical properties.

It is finally also an object of this invention to provide a plastic scintillator composition in which internal reabsorption or self-absorption of fluorescence is reduced.

These and other objects are accomplished by mixing a solvent selected from the group consisting of styrene, methylstyrene with the methyl group attached to the ring, and p-vinylbiphenyl with p-terphenyl as a fluor and with a small quantity of a second fluor, this second fluor being selected from the group consisting of 1,1,4,4-tetraphenyl-1,3-butadiene, p,p'-quaterphenyl and diphenyl stilbene and heating the mixture obtained until it is polymerized. The compositions and scintillators obtained by this process are also a subject of this invention.

The solvent yielding the highest efficiency and which was also preferred on account of its higher boiling point is methylstyrene. A mixture of p- and m-methylstyrene has given excellent results.

The p-terphenyl is preferably present in a quantity of from about 3 to 5% by weight, while the second fluor needs to be present only in a quantity of from 0.01 to 0.3%. The preferred percentages for the individual compounds used as the second fluor are from 0.01 to 0.1% for 1,1,4,4-tetraphenyl-1,3-butadiene, 0.02% representing the optimal amount. For the quaterphenyl a quantity between 0.2 and 0.3% was found best, while for diphenyl stilbene the range between 0.01 and 0.1% was most satisfactory, 0.1% giving the very best results. Several other substances were also tested as a second fluor, including diphenylhexatriene; however, it was found that none of the others brought about the improvement achieved by these three second fluors listed above.

The improvement obtained by the addition of a highly conjugated hydrocarbon having four phenyl groups as a second fluor, such as 1,1,4,4-tetraphenyl-1,3-butadiene, quaterphenyl and diphenyl stilbene according to this invention is obvious from the following comparison: While a polymerized plastic scintillator containing m- and p-methylstyrene as the solvent and p-terphenyl as the only fluor in an amount ranging between 3 and 5% had a relative efficiency (as compared with that of an anthracene crystal) of about 31%, a scintillator obtained in accordance with this invention by polymerizing a mixture of said methylstyrene, 4% of p-terphenyl and 0.02% of 1,1,4,4-tetraphenyl-1,3-butadiene showed a relative efficiency of 47%.

It has been found that oxidation products of the components of the scintillator composition absorb or quench the fluorescence and thus impair the efficiency of the polymerized scintillator. It is therefore advisable to use very pure monomers and also to prepare the scintillator while excluding air.

The method which was found best for the preparation of the scintillators of this invention used monomers which had been purified by repeated vacuum distillation at from 30 to 40° C. and from 10 to 15 mm. Hg. By this vacuum distillation separation of a mixture of p- and m-methylstyrenes is not brought about. Styrene, at 10 mm. Hg, distills at about 31° C. and methylstyrene at about 50° C. at the same pressure. No polymerization promoter, no plasticizer and no mold releasing agent were added.

For the polymerization, vials of pyrex glass were used which had a volume by about 15% greater than that of the cold materials in order to allow for thermal expansion. The vials used by the inventors had a filling stem 6 inches long and ⅜ inch in diameter. The mixture of the fresh distilled monomer and the fluors was transferred to the vial and the air was then exhausted by a vacuum pump. It was found advantageous, though optional, alternately to freeze and thaw the monomer in order to reduce evaporation losses and to improve the removal of air.

Thereafter the vial was sealed under vacuum and inserted into a thermostatically controlled oil bath having a temperature between 115 and 120° C. When the vial had assumed the temperature of the bath, the vial was removed and shaken in order to bring about complete dissolution of the ingredients. The vial was then reimmersed and left in the bath at the above temperature for about a day. Thereafter the temperature was raised to about 135° C. and maintained at that temperature for six days. The bath temperature was then reduced very slowly to about 75° C. and held there for at least 12 hours for annealing of the polymerized composition.

After annealing, the vial was removed from the bath and the filling stem was broken off. The remainder of the vial was then immersed in a large volume of water of about 75° C. and allowed to cool there slowly; during this step the plastic shrunk and separated from the glass wall. Slow cooling was found to be essential to avoid voids or vacuum bubbles and also internal stresses. The finished plastic was finally machined into cylinders of the desired size and polished.

In order to test the various plastics as to their scintillation efficiency, one end of the polished cylinder was attached to the window of a 5819-photomultiplier tube and the remainder of the cylinder was wrapped in a highly polished aluminum foil, which served as a reflector. A narrow collimated beam of $Cs^{137}$ gamma-rays was passed through the cylinder normal to its axis and the pulse height was determined.

It will be understood that this invention is not to be limited to the details given herein but that it may be modified within the scope of the appended claims. It will, for instance, also be understood that the scintillators of this invention may be made by any method other than that described above.

What is claimed is:

1. A process of making a scintillator composition for scintillation counters comprising mixing a solvent selected from the group consisting of styrene, methylstyrene wherein the methyl group is attached to the ring and p-vinylbiphenyl, from 3 to 5% by weight of p-terphenyl as a fluor and from 0.01 to 0.3% of a second fluor selected from the group consisting of 1,1,4,4-tetraphenyl-1,3-butadiene and p,p'-quaterphenyl, heating the mixture obtained while excluding air to from 115–135° C. until it is polymerized, annealing the mixture at about 75° C. for at least twelve hours, and slowly cooling the mixture to room temperature.

2. The process of claim 1 wherein the second fluor is 1,1,4,4-tetraphenyl-1,3-butadiene and is present in a quantity between 0.01 and 0.1% by weight.

3. The process of claim 2 wherein the quantity is 0.02%.

4. The process of claim 1 wherein the second fluor is p,p'-quaterphenyl and is present in a quantity between 0.2 and 0.3% by weight.

5. A scintillator composition for scintillation counters consisting of a polymerized mixture of a solvent selected from the group consisting of styrene, methylstyrene wherein the methyl group is attached to a ring carbon and p-vinylbiphenyl, from 3 to 5% by weight of p-terphenyl as a fluor and from 0.01 to 0.3% of a second fluor selected from the group consisting of 1,1,4,4-tetraphenyl-1,3-butadiene and p,p'-quaterphenyl.

6. The composition of claim 5 wherein the second fluor in said mixture is 1,1,4,4-tetraphenyl-1,3-butadiene and is present in a quantity between 0.01 and 0.1% by weight.

7. The composition of claim 6 wherein the quantity is 0.02%.

8. The composition of claim 5 wherein the second fluor of said mixture is p,p'-quaterphenyl and is present in a quantity of from 0.2 to 0.3% by weight.

References Cited in the file of this patent

Harding: Nucleonics, vol. 10, No. 3, 1952, page 37.
Curran: Luminescence and the Scintillation Counter, 1953, pages 126, 127.